March 23, 1965 R. M. EDWARDS ETAL 3,174,834
FLUIDIZED BED REACTOR
Filed Aug. 24, 1959
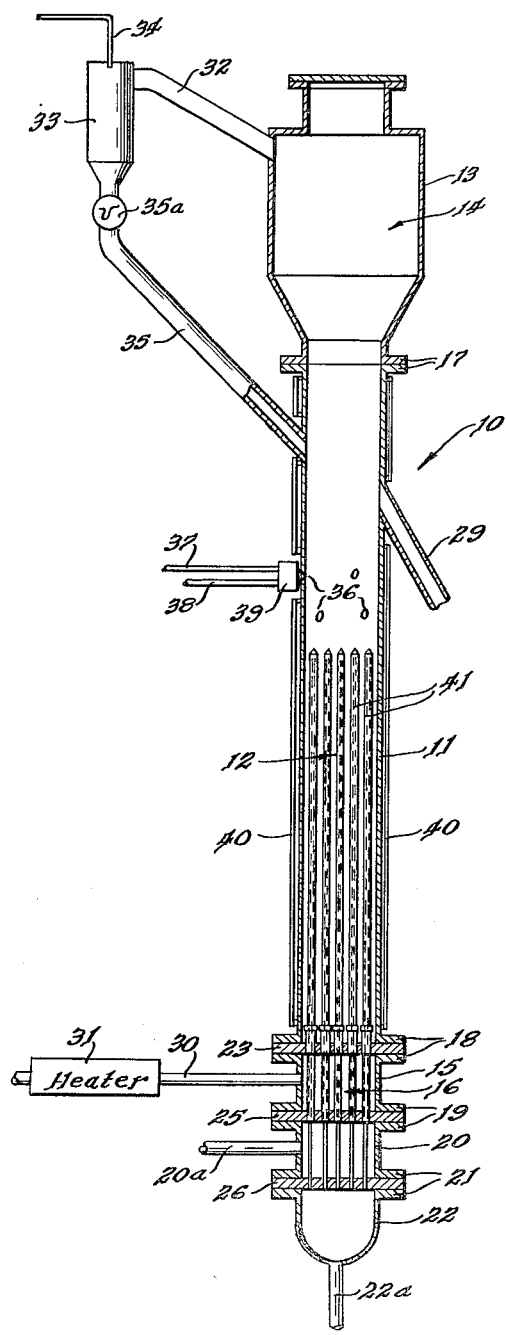
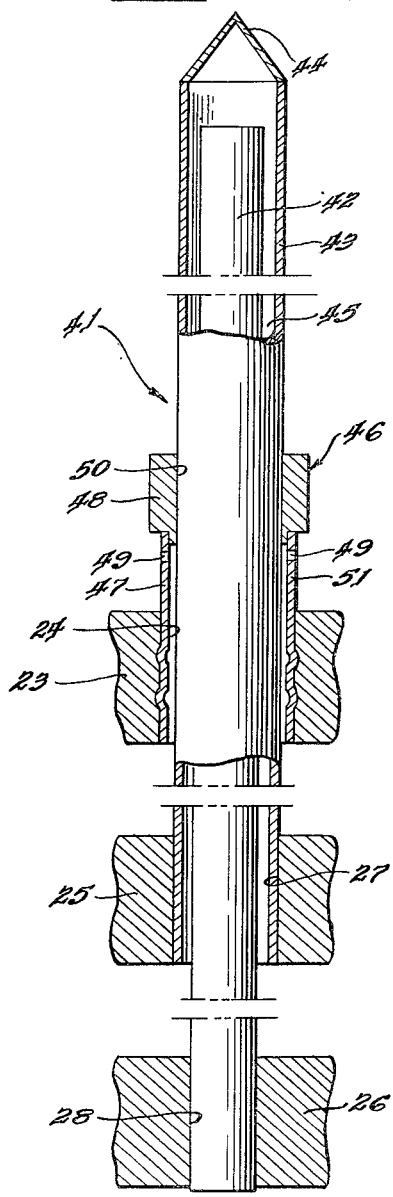
INVENTORS
Richard M. Edwards
Sheldon N. Robinson
Eugene F. Sanders
Attorney

3,174,834
FLUIDIZED BED REACTOR
Richard M. Edwards, Tucson, Ariz., and Sheldon N. Robinson, Brentwood, and Eugene F. Sanders, St. Louis, Mo., assignors, by mesne assignments, to the United States of America as represented by the United States Atomic Energy Commission
Filed Aug. 24, 1959, Ser. No. 835,807
4 Claims. (Cl. 23—284)

This invention relates to an apparatus for simultaneously evaporating and calcining metallic salt solutions. In more detail the invention relates to a fluidized bed reactor suitable for use with heat sensitive materials.

The apparatus according to the present invention is particularly suitable for dehydrating and calcining uranyl nitrate hexahydrate according to the equation

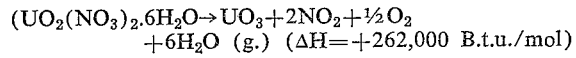

$$(UO_2(NO_3)_2 \cdot 6H_2O \rightarrow UO_3 + 2NO_2 + \tfrac{1}{2}O_2 + 6H_2O \text{ (g.)} \quad (\Delta H = +262{,}000 \text{ B.t.u./mol})$$

which is one step in the commercial process for the transformation of uranium ore to uranium metal. Present commercial processes for the processing of uranium ore are batch processes. It would be highly desirable to formulate a complete continuous process for this transformation. By the use of the fluidized bed technique according to this invention uranyl nitrate hexahydrate may be reduced to dryness and calcined to uranium trioxide in a form which may then be continuously reduced to uranium dioxide and fluorinated to $UF_4$. The $UF_4$ may then be converted to the metal by conventional procedures.

It will be noted from the above equation that heat is required to carry out the reaction. Since the product of this reaction is heat sensitive it is essential that the heating be carried out in such a way that localized zones of intense heat not be formed. It is also of course necessary to the satisfactory operation of the process that the fluidization be uniform with thorough, turbulent mixing throughout the fluidization zone.

It is accordingly an object of the present invention to develop a fluidized bed reactor suitable for evaporating and calcining nitrate solutions.

It is a more specific object of the present invention to develop a fluidized bed reactor containing internal heaters which do not adversely affect the fluidization qualities of the reactor.

These and other objects of the present invention are attained by our novel device which employs vertical, internal, tubular heaters of different lengths.

The invention will now be described with reference to the accompanying drawing wherein:

FIG. 1 is a diagrammatic vertical cross-sectional view of a fluidized bed reactor according to our invention, and FIG. 2 is an enlarged detail view showing the construction of the distribuiton plate.

In the drawing a column 10 includes a reaction section 11, defining a reaction zone 12, a disengaging section 13 of enlarged diameter, defining a disengaging zone 14, and a gas inlet section 15, defining a gas chamber 16. Reaction section 11 and disengaging section 13 are joined by flanges 17 while reaction section 11 and gas inlet section 15 are joined by flanges 18. Connected to the bottom of gas inlet section 15 by flanges 19 is a heating medium inlet header 20 provided with an inlet line 20a and to the bottom of inlet header 20 by flanges 21 is connected a heating medium outlet header 22 provided with an outlet line 22a.

A distribution plate 23 provided with openings 24 therein (see FIG. 2) separates reaction zone 12 from gas chamber 16 while plates 25 and 26 provided with openings 27 and 28, respectively, separate gas chamber 16 from heating medium inlet header 20 and heating medium inlet header 20 from heating medium outlet header 22.

A product delivery conduit 29 penetrates reaction section 11 relatively near the top thereof. A gas inlet pipe 30, after passing through a heater 31, leads into gas chamber 16 while an off-gas line 32 leads from the top of disengaging section 13 of column 10 to a cyclone 33. Gases from the cyclone exit therefrom through cleaned gas line 34 and the dust recovered by the cyclone is returned to the column through dust return line 35, in which there is a rotary valve 35a.

Solution to be denitrated and dehydrated is fed to the column through a plurality of atomizing spray nozzles 36 which penetrate reactor section 11 of column 10 below the point at which product is removed but above the hereinafter described internal heaters. An air inlet 37 and a feed inlet 38 are connected to a nozzle body 39 for each nozzle 36.

The reactor is provided with both internal and external heaters. External strip heaters 40 located on the exterior of column 10 are provided primarily for use in start up. Vertical tubular heaters 41 are used in operation of the reactor. These heaters 41 penetrate distribution plate 23 through openings 24 and rise vertically into reaction zone 12 of column 10. Heaters 41 comprise an inner tube 42 and a concentric outer tube 43 which is closed at the top 44 thereof. Inner tube 42 and outer tube 43 are spaced apart to provide an annular passage 45 therebetween. Inner tube 42 stops short of the top 44 of outer tube 43. Outer tube 43 extends into openings 27 in plate 25 and terminates at the bottom thereof. Inner tube 42 extends into openings 28 in plate 26 and terminates at the bottom thereof.

The detailed construction of distribution plate 23 will next be described with particular reference to FIG. 2 of the drawing. As shown by this figure bubble caps 46, consisting of a short tube 47 provided with a cap 48, are positioned in openings 24 in distribution plate 23 and extend a short distance thereabove. Just under the cap 48, each tube 47 has three holes 49 which are equally spaced about the tube. Heaters 41 pass through openings 50 in caps 48 of the bubble caps 46 providing a passage 51 between tubes 47 and heaters 41.

In operation air is introduced from gas inlet pipe 30 into gas chamber 16. The gas traverses the annular space 51 between tubes 47 of bubble caps 46 and the internal heaters 41 and passes through openings 49 in tubes 47 into reaction zone 12 of the fluidized bed reactor. Likewise, a heating medium is introduced into heating medium inlet header 20 through line 20a, traverses annular passage 45 between inner tube 42 and outer tube 43 and returns to outlet header 22 and outlet line 22a through inner tube 42.

The following tests were carried out in a 10-inch diameter, stainless steel pipe, 6 feet long. The disengaging section was 20 inches in diameter and 30 inches high. The overflow product delivery conduit 29 had its inlet 4 feet 6 inches above distribution plate 23. Thirty 1-inch heaters aranged on 2⅛, 5⅛, and 8⅛-inch circles were vertically disposed in the reactor. These heaters were all 30 inches in length. The heating medium employed was a hot molten salt mixture (45% sodium nitrite and 55% potassium nitrate) which circulated through the heaters from a steel pot where it was heated by electrical immersion heaters.

The general operating procedure was as follows. With air passing through the spray nozzles and the fluidizing-air distribution plate, the reactor was charged with approximately 300 lbs. of $UO_3$. The bed was heated to operating temperature with external electrical strip heaters and by the circulation of molten salt through the internal bayonet heaters. When the bed reached operating temperature, the external strip heaters were turned off and water was introduced into the spray nozzles. After feeding water for a short period, uranyl nitrate solution was substituted. The feed rate and atomizing air pressure were then adjusted to the desired values.

The detailed conditions of each run are summarized in Table I.

$P_1$ = bed pressure at $L_1$
$P_2$ = bed pressure at $L_2$
$P_0$ = bed pressure at the top of the fluid bed
$P_x$ = bed pressure at $L_x$
$\rho$ = fluidized bed density
$A_1$ = free cross-sectional area at $L_1$
$A_2$ = free cross-sectional area at $L_2$
$A_x$ = free cross-sectional area at $L_x$
$D$ = diameter of the reactor shell
$d$ = diameter of a heating element
$n$ = number of heating elements

*Table I*
FLUID-BED DENITRATOR OPERATING CONDITIONS

| Condition | Run 31 | Run 32 | Run 34 | Run 35 | Run 36 | Run 37 |
|---|---|---|---|---|---|---|
| 1. UNH Feed Rate, gal./hr | 11.2 | 10.2 | 6.3 | 8.5 | 10.9 | 8.25 |
| 2. Feed Concentration, percent | 73.5 | 74 | 75 | 75 | 75 | 80 |
| 3. Sulfate Added, p.p.m. (U basis) | 800 | 800 | 800 | 800 | 800 | 1,200 |
| 4. Average Production Rate, lbs. $UO_3$/hr | 73 | 67 | 38 | 56.5 | 73 | 63 |
| 5. Fluidizing Velocity, ft./sec | 1.3 | 0.93 | 1.3 | 1.55–1.7 | 1.6–1.9 | 1.65 |
| 6. Fluidizing Gas Temperature, °F | 708 | 662 | 770 | 800 | 760 | 790 |
| 7. Average Bed Temperature, °F | 755 | 720 | 690 | 700 | 680 | 700 |
| 8. Salt Temperature, °F | 940 | 895 | 940 | 960 | 940 | 950 |
| 9. Average Molten Salt Temperature Drop, °F | 9.8 | 4 | 6–16 | 12–20 | 8–18 | |
| 10. Salt Flow, g./min | 57.5 | 103 | 35–39 | 24–40 | 15–64 | |
| 11. Nozzles Used | 1 | 1 | 1 | 1 | 1 | 1 |
| 12. Atomizing Air Pressure, p.s.i.g | 30 | 25 | 25–35 | 20–42 | 25–35 | 25 |
| 13. Atomizing Air Flow, SCFM | 0.65 | 0.65 | 1.0–2.1 | 1.0–1.9 | 0.95–1.25 | 0.76 |
| 14. Total Hours of Operation | 4 | 1.5 | 38 | 31 | 31 | 29 |
| 15. Percent On-stream | 100 | 100 | 70 | 67 | 60 | 98 |

The uranium trioxide particles produced in the fluid-bed denitrator had a smooth glossy appearance and a spherical shape. Many of the larger particles appeared to be an agglomerate of the smaller spherical particles coated with a thin layer of $UO_3$. The chemical analysis of the uranium trioxide product is shown in Table II.

*Table II*
CHEMICAL ANALYSIS OF $UO_3$ PRODUCED IN FLUID-BED DENITRATOR

| | Run 34 | Run 35 | Run 36 | Run 37 |
|---|---|---|---|---|
| $UO_3$, Percent | 99.36 | 99.45 | 99.39 | 99.14 |
| Nitrate, Percent (Sample Basis) | 0.50 | 0.56 | 0.58 | 0.81 |
| $H_2O$, Percent (Sample Basis) | 0.12 | 0.14 | 0.13 | 0.13 |
| HCl Insoluble, Percent (U Basis) | 0.08 | 0.02 | 0.00 | 0.02 |
| Sulfate, p.p.m. (Sample Basis) | 585 | 550 | 685 | 1,095 |
| Fe, p.p.m. (U Basis) | 27 | 20 | 21 | 12 |

Although results in general were good it was observed that the quality of fluidization was not as good as anticipated and in particular that there was bridging of the fluidized material above the heaters resulting in decreased vertical mixing within the fluidized bed. It was found that this phenomenon can be avoided by varying the lengths of the heaters and forming the top of each heater into the shape of a cone. The length of the heaters to be employed is computed from the following equations:

(1) $$P_x = P_o + \rho L_x$$

(2) $$\frac{1}{A_x} = P_x \left[ \left( \frac{1}{P_2 A_2} \right) + \left( \frac{L_x - L_2}{L_1 - L_2} \right) \left( \frac{1}{P_1 A_1} - \frac{1}{P_2 A_2} \right) \right]$$

(3) $$A_x = \frac{\pi}{4} \left[ D^2 - nd^2 \right]$$

where
$L_1$ = distance from the bottom of the tapered section to the top of the fluid bed
$L_2$ = distance from the top of the tapered section to the top of the fluid bed
$L_x$ = distance from a point between $L_1$ and $L_2$ to the top of the fluid bed Using these equations the lengths of the heaters for a reactor constructed as described in the specific embodiment, except that the heaters vary from two to three feet in length and the length of the fluidized bed is 4.5 feet, may be determined from the following table. This table gives the number of heaters which should be present at intervals of a tenth of a foot. The pressure at the top of the bed is atmospheric and the bed density is 190 lbs./ft.$^3$.

*Table III*

| $L_x$: | $n$ |
|---|---|
| 2.5 | 30 |
| 2.4 | 27.5 |
| 2.3 | 25 |
| 2.2 | 22.5 |
| 2.1 | 20 |
| 2.0 | 17 |
| 1.9 | 14 |
| 1.8 | 11 |
| 1.7 | 7.5 |
| 1.6 | 4 |
| 1.5 | 0 |

By extrapolation between the points given, proper lengths of all the heaters are determined.

In order to verify experimentally this concept a model fluidized bed reactor was constructed of Plexiglas wherein the behavior of the fluidized bed could be directly observed. The fluidization quality was checked visually with heaters of the same lengths having flat tops and with heaters of different lengths having conical tops. It was found that the detrimental effects were eliminated by the modifications. Observation of the operation of this model indicated that the deleterious effects were almost completely eliminated.

The advantages of the described construction will next be discussed. In the first place internal heaters have a great advantage over external heaters for large reactors particularly where the bed material is heat sensitive prohibiting the use of a high temperature heat source. If external heaters only were to be employed in a large reactor, the heat sources would have to produce a relatively high temperature since the surface to volume ratio of a reactor decreases as the diameter increases. Therefore the volume of the bed gets larger faster than does the surface area available for heat transfer of heat from external heaters.

In the second place vertical heaters in a vertical column are advantageous over horizontal heaters since horizontal heaters result in a discontinuous variable cross-sectional area and, therefore, a variable fluidizing velocity through the bed. The variable velocity affects adversely the fluidization characteristics of the reactor. Because of the variable cross-section and unusual flow patterns caused by horizontal heaters, only a limited number of heaters may be inserted in this manner. Experience has shown that a maximum of 18½-inch diameter, 6-inch long, horizontal heaters can be inserted into a 7-inch long section of a 6-inch diameter fluidized bed. While these heaters are 6 inches long, the average length actually inserted in the bed is about 4 inches (because of the curvature of the reactor shell). On the other hand, 48 heaters, 7 inches long, can be inserted vertically into a 7-inch long section of a 6-inch diameter fluidized bed, or an increase of 370% over the maximum heat transfer surface that can be inserted horizontally. Our experience has shown that up to 33% of the free cross-sectional area can be taken up with vertical heaters without introducing adverse effects into the reactor.

In addition the horizontal elements suffer from the disadvantages that there is considerable "dead" or non-fluidized area immediately above each heater and there may be localized erosion on the bottom of horizontal elements because of the perpendicular fluid flow. Besides the detrimental effect on fluidization, the dead area above each horizontal heater will decrease the effective heat transfer area of the heater.

Next we will compare heaters of different lengths with heaters of the same length. As the gas rises through a bed provided with vertical heaters, there is a gradual increase in the gas volume and superficial velocity until the tops of the heaters are reached. This follows because the pressure decreases as the gas rises through the bed. When the gas reaches the top of the heaters, there is an abrupt decrease in gas velocity, followed by another gradual increase until the gas reaches the top of the bed. This abrupt decrease in gas velocity causes bridging of the fluidized material above the heaters. This condition decreases the vertical mixing of the fluidized material so that the ultimate in efficiency is not attained. An additional cause of this bridging may be the large flat surface area presented by the flat tops of the heaters. This condition of bridging is avoided by varying the lengths of the heaters so that there is no abrupt velocity change and making the tops of the heaters conical.

Although we have described the invention with particular reference to tubular heaters employing a molten salt as heating medium, it will be at once obvious that other heating mediums could be employed or that vertical electric heaters could be substituted for the described heaters. However, the preferred form of the invention is that described.

In addition, it will be evident that the apparatus described can be used to dehydrate and denitrate other nitrate solutions. For example aluminum nitrate solutions resulting from the processing of nuclear materials may be treated as may magnesium nitrate solutions.

It will be understood that the invention is not to be limited to the details given herein but that it may be modified within the scope of the appended claims.

What is claimed is:

1. A fluidized-bed reactor comprising a vertical column having a horizontal plate extending across the column dividing the column into a lower gas chamber and an upper fluidization zone, means for introducing a fluidizing gas into the gas chamber, a plurality of bubble caps disposed in openings in said horizontal plate, said bubble caps consisting of a short tube and a cap, each of said tubes containing a plurality of holes extending therethrough just below the caps, means for spraying a solution horizontally into the fluidization zone of the column, means for removing product from the column, and means for heating the column comprising a plurality of elongated heaters extending through the center of the bubble caps spaced from said tubes and rising vertically above the horizontal plate to various heights within the fluidization zone wherein each heater has a conical top, said heaters being sealed from the gas chamber to prevent ingress of gas therefrom.

2. A fluidized-bed reactor according to claim 1 wherein the heaters comprise an outer tube and a shorter inner tube concentric therewith and means for passing a heating medium therethrough.

3. A fluidized-bed reactor according to claim 2 and including a heating medium inlet header disposed just below the gas chamber in communication with the passage between the inner and the outer tubes, a heating medium outlet header disposed just below the heating medium inlet header in communication with the inner tube of the heater, an inlet for heating medium leading to said inlet header, and an outlet for heating medium leading from said outlet header.

4. A fluidized-bed reactor according to claim 3 wherein the height of the elongated heaters is defined by the following equations:

(1) $$P_x = P_0 + \rho L_x$$

(2) $$\frac{1}{A_x} = P_x \left[ \left(\frac{1}{P_2 A_2}\right) + \left(\frac{L_x - L_2}{L_1 - L_2}\right)\left(\frac{1}{P_1 A_1} - \frac{1}{P_2 A_2}\right) \right] (N)$$

(3) $$A_x = \frac{\pi}{4} D^2 - nd^2$$

where
$L_1$ = distance from the bottom of the tapered section to the top of the fluid bed
$L_2$ = distance from the top of the tapered section to the top of the fluid bed
$L_x$ = distance from a point between $L_1$ and $L_2$ to the top of the fluid bed
$P_1$ = bed pressure at $L_1$
$P_2$ = bed pressure at $L_2$
$P_0$ = bed pressure at the top of the fluid bed
$P_x$ = bed pressure at $L_x$
$\rho$ = fluidized bed density
$A_1$ = free cross-sectional area at $L_1$
$A_2$ = free cross-sectional area at $L_2$
$A_x$ = free cross-sectional area at $L_x$
$D$ = diameter of the reactor shell
$d$ = diameter of a heating element
$n$ = number of heating elements.

References Cited by the Examiner

UNITED STATES PATENTS

| | | | |
|---|---|---|---|
| 2,163,599 | 6/39 | Hondry | 165—104 X |
| 2,546,570 | 3/51 | Vance | 23—288.3 |
| 2,547,021 | 4/51 | Lassiat et al. | 23—288.9 X |
| 2,981,592 | 4/61 | Lawroski | 23—14.5 |
| 2,997,286 | 8/61 | Friese | 165—146 X |
| 3,040,439 | 6/62 | Frost | 23—288.35 X |

FOREIGN PATENTS 165,605  10/55  Australia.

OTHER REFERENCES

TID–7501 (Pt. 1), pp. 53–65, February 1956.
MCW–1409, pp. 33–39, Nov. 1, 1957.
Leva: "Fluidization," pp. 208–211, (1959); citing bibliographic reference Toomey et al., (p. 246), Chem. Eng. Progr. Symposium Ser. 5, 49, pp. 51–63 (1953).

MORRIS O. WOLK, *Primary Examiner.*

MAURICE A. BRINDISI, CARL D. QUARFORTH, JAMES H. TAYMAN, JR., *Examiner.*